Aug. 12, 1958     E. A. GOVATSOS     2,846,960
DEPOSITOR FOR SANDWICHING MACHINE
Filed Nov. 1, 1955     7 Sheets-Sheet 1

INVENTOR,
Edward A Govatsos
BY Bair, Freeman
& Molinare Attorneys.

Aug. 12, 1958  E. A. GOVATSOS  2,846,960
DEPOSITOR FOR SANDWICHING MACHINE
Filed Nov. 1, 1955  7 Sheets-Sheet 2

INVENTOR.
Edward A. Govatsos.
BY
Bair, Freeman & Molinare
Attorneys.

United States Patent Office 2,846,960
Patented Aug. 12, 1958

2,846,960

DEPOSITOR FOR SANDWICHING MACHINE

Edward A. Govatsos, Canton, Mass., assignor to Peters Machinery Company, Chicago, Ill., a corporation of Illinois Application November 1, 1955, Serial No. 544,255

13 Claims. (Cl. 107—1)

This invention relates to a sandwiching machine for assembling those types of "sandwiches" which comprise two cookies with a filler of creme between them.

One object of the present invention is to provide a sandwiching machine which has a pair of improved cookie magazines out of each of which a single cooky is fed, each magazine being designed to accommodate without any change cookies or cakes of various outline configurations such as square, circular, etc., and insures proper positioning thereof on a carrier "book."

Another object is to provide a shaker arrangement for vertically vibrating the cooky magazines to insure against cookies remaining in adherence with the trough of the magazine.

Still another object is to provide a sandwiching machine having a novel depositor, including an auger feed and a drum arrangement with a cut-off wire, for depositing sandwich creme or related materials on base cakes of any desired shape at high speeds and without the use of pistons, the high speed feature being attained because there is no intermittent or reciprocating motion in the apparatus and all elements thereof rotate at a constant speed.

A further object is to provide a depositor in which a pair of drums are eccentrically related and one of them has entrance and exit openings into which the creme is received at the widest spacing between the drums and squeezed from between them at the closest spacing thereof at which point a cut-off wire cuts or scrapes off a measured quantity of extruded creme causing it to be deposited on the cooky as it passes beneath the drums.

Still a further object is to provide a sandwiching machine in which carriers are in the form of "books," cam means being provided for closing, inclining and opening the "leaves" of the book, a guide rod arrangement cooperating with cam surfaces of the leaves to control them as desired, and additional cams being provided which are adjustable to control the thickness of the sandwiches.

An additional object is to provide the books with spaced projections along their rear edges for removing cookies from the stacks of cookies in the magazines, and lost motion pivot connections between the books and a carrier therefor that is attached to a conveyor chain to permit use of cookies of different thicknesses and coating material or creme of the desired thickness deposited between the cookies, the leaves also having intermeshing lugs to support the sandwich in the process of bringing the cookies together and to support the completed sandwich upon one leaf of the book while the sandwich is being brought to a horizontal position for discharge to a stacker.

Additional objects are to provide tracks on a conveyor frame for carrier assemblies wherein each assembly has a pair of leaves on each of which a cooky lies, and creme is deposited on one of the cookies, the two leaves then being closed by cams through which they pass, thus forming a sandwich, whereupon the carrier is cammed open again and the finished sandwich is stripped from the carrier and deposited in a stacker, the components of the sandwich being carried through the machine by the carrier assembly and all the necessary operations performed thereon to provide a completed sandwich by the time it reaches the stacker.

Another additional object is to provide a stacker at the discharge end of the carrier conveyor together with stripper wires entering slots in one leaf of the carrier assembly and also a deflector shoe at the discharge end to direct sandwiches into slots of the stacker conveyor.

Still another additional object is to provide the stacker with a stripper that enters a slot in the book leaf that is carrying the completed sandwich as the book goes over certain sprockets of the machine to strip the sandwich off the leaf when the rate of operation of the machine is 350 per minute or less. At higher speeds, such as 600 per minute (from each of the two conveyors of the machine) the stripper is ineffective and for this high speed a shoe is used at the discharge end of the carrier conveyor against which the completed sandwiches are thrown by momentum and guided into rearwardly inclined flights on a take-away conveyor.

A further additional object is to provide a second take-away conveyor on which the completed sandwiches are in partially lapped relation with one sandwich having a portion beneath the preceding sandwich by virtue of which interlaying of the sandwiches a series may be readily picked off the conveyor for packaging without disturbing the feed line coming off the machine as occurs in prior machines where overlap is in the opposite direction.

Further additional objects are to provide a stacker having U-shaped fingers for picking up sandwiches stripped from or thrown off of the open carrier books at the discharge end of the machine, the stacker consisting of a continuously moving chain containing inclined carrier lugs spaced and timed to receive the individual sandwiches as they fall down an inclined chute after being stripped or thrown from the carrier books, the sandwiches falling between successive lugs in the stacker which push them up an inclined chute and off onto a plain conveyor belt moving at the same speed, from which they are removed for packaging, the arrangement of the stacker being such that the tops of the sandwiches are inclined rearwardly rather than forwardly as in other stackers, thus allowing the packing operator easier access to the cookies for packing by reason of each sandwich lying on its successor.

Still a further additional object is to provide a drive arrangement including a differential adjustment for the carrier conveyor for timed relation to the depositor discharge so that centered deposit of the creme on the cookies is had, the drive through the differential mechanism (which is adjustable for aligning carrier assemblies of the conveyor and the books) enabling proper regulation in relation to the depositor to correct for a too early or too late deposit off-center of the cooky.

With these and other objects in view, my invention consists in the construction, arrangement and combination of the various parts of my sandwiching machine, whereby the objects above contemplated are attained, as hereinafter more fully set forth, pointed out in my claims and illustrated in detail on the accompanying drawings, wherein:

On the accompanying drawings I have used the reference numeral 16 to indicate a base frame and 18 a somewhat longer upper frame superposed thereon. The frames 16 and 18 support the various instrumentalities of my machine as will hereinafter appear.

Figures 1, 1A, 10A:
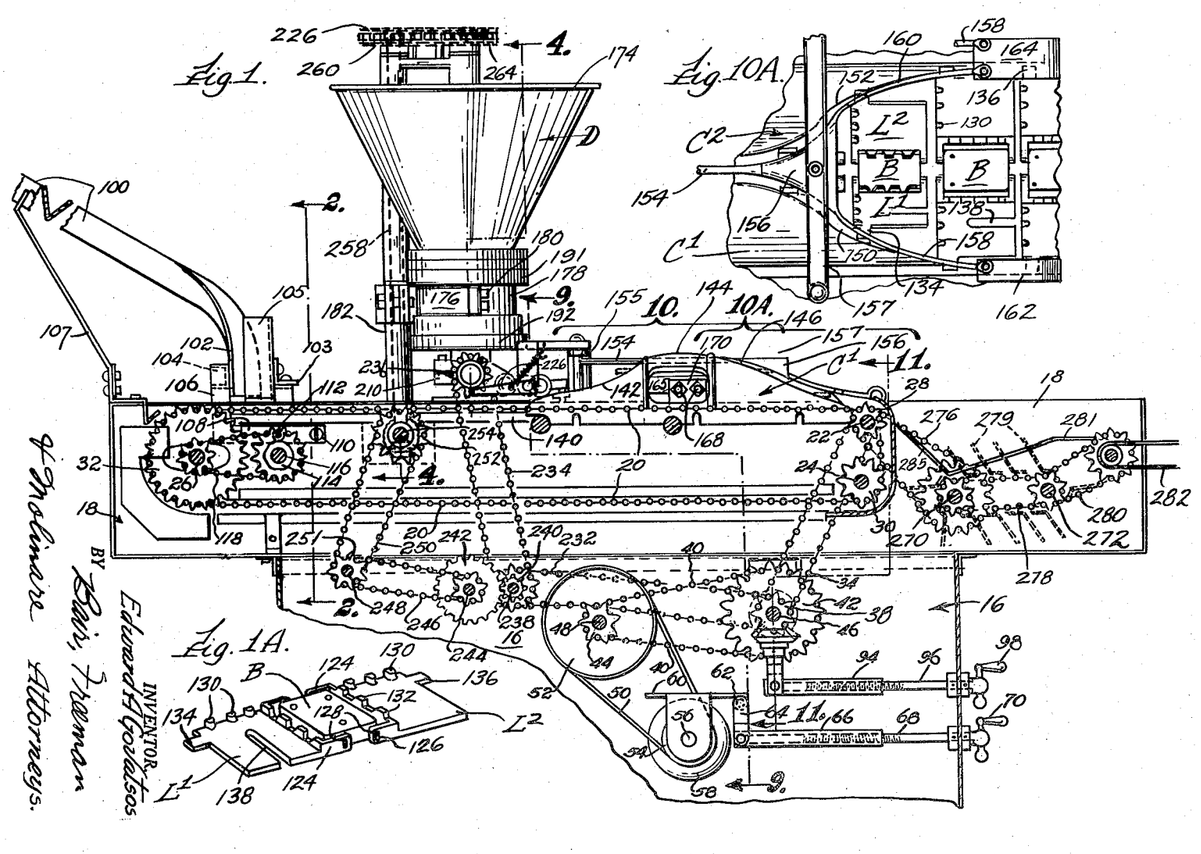
Fig. 1 is a somewhat diagrammatic part side view and part sectional view of a sandwiching machine embodying my present invention, the sandwich carriers being omitted.
Fig. 1A is a perspective view of one of the sandwich carrier assemblies, a number of which are used in my machine.
Fig. 10A is a similar plan view of that portion of Fig. 1 indicated by the bracket 10A and is a continuation on a reduced scale of the right hand end of Fig. 10.
Figure 2:
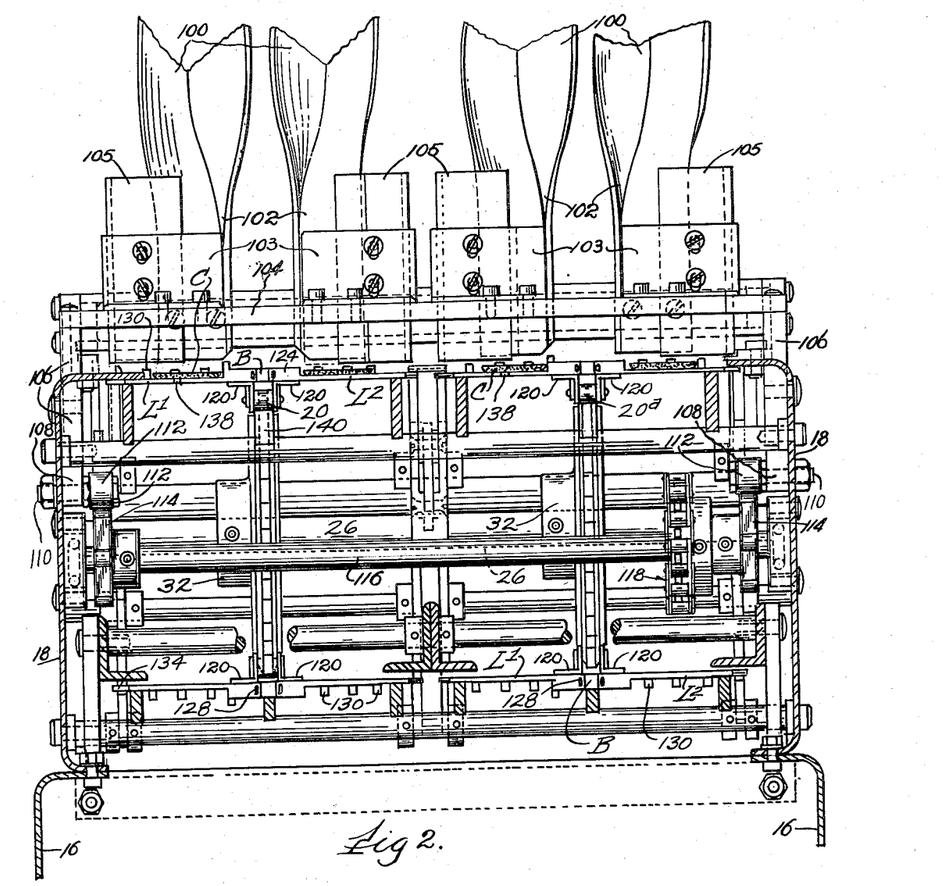
Fig. 2 is an enlarged vertical sectional view on the line 2—2 of Fig. 1 showing cooky magazines and associated parts.

A carrier chain 20 is provided in the right or near-side half of the machine and a second carrier chain 20a in the left half thereof as shown in Fig. 2, the machine being designed to simultaneously form two rows of sandwiches, although of course it may be designed to accommodate any number of rows desired. Both carrier chains 20 and 20a are supported by three shafts 22, 24 and 26 as shown in Fig. 1, sprockets 28, 30 and 32 respectively being secured to the shafts for this purpose.

Figure 11:
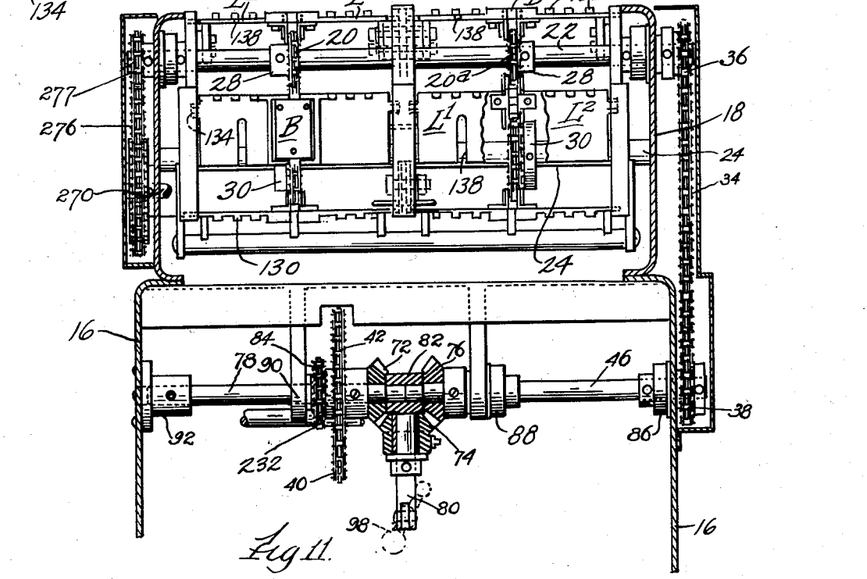
Fig. 11 is a vertical sectional view on an enlarged scale on the line 11—11 of Fig. 1 showing drive details and a differential adjusting mechanism.

A drive chain 34 is provided for the shaft 22 and is trained around sprockets 36 and 38 for this purpose, as shown in Fig. 11, the sprocket 36 being on the shaft 22 and the sprocket 38 being on a shaft 46 rotatable in bearings 86 and 88.

For driving the shaft 46, a chain 40 is provided extending around a sprocket 42 on a shaft 78 rotatable with respect to the shaft 46 and a sprocket 44 on a shaft 48.

The shaft 78 is rotatable in bearings 90 and 92 and rotates a bevel gear 72 meshing with a second bevel gear 74, which in turn meshes with a third bevel gear 76 (see Fig. 11). The bevel gear 76 is secured to the shaft 46 for rotating it while the bevel gear 74 is freely rotatable on a stub shaft 80. The shaft 80 is carried by a hub 82 oscillatably adjustable on the adjacent ends of the shafts 46 and 78. The adjustment is secured by a threaded sleeve 94 on a threaded rod 96 (see Fig. 1). The shaft is held against endwise movement and is manually rotatable by a crank 98 for a purpose which will hereinafter appear.

The shaft 48 is driven by a belt 50 around a pulley 52 thereon and around an adjustable pulley 54. The pulley 54 is mounted on a motor shaft 56 of a motor 58. The motor is mounted on a base 60 pivoted on a rock shaft 62. An arm 64 extends from the motor base for oscillating it on the rock shaft for belt tightening and speed adjusting purposes in a well known manner and this is accomplished by means of a threaded sleeve 66 with which a threaded rod 68 coacts, the rod being rotatable and non-slidable relative to the frame 16 and provided with a crank 70 for rotating it.

Referring to Figs. 1 and 2, four V-shaped cooky troughs 100 are provided which, due to the V-shape, permit handling of cookies of various outline configuration such as square, circular, etc. The lower ends of these troughs are twisted 45° as indicated at 102 so that square and hexagon shaped cookies will line up properly with the line of movement through the machine and are secured to a cross-bar 104. The outer ends of the troughs 100 are supported by bars 107 which offer some resiliency for a purpose which will hereinafter appear.

Adjacent the front sides of the lower ends of the cooky troughs 100 are brackets 103 supporting guide and gauge plates 105 which, as shown in Fig. 2, are vertically adjustable relative to the brackets by means of vertical slots and clamping screws. These plates are adjusted to the thickness of cooky being sandwiched and serve as stripper shoes for stripping only a single bottom cooky from under the magazine stack.

Each end of the crossbar 104 is supported on the upper end of a post 106 having its lower end secured to the left-hand end of an arm 108 (see Fig. 1), the right-hand end of the arm being pivoted at 110. Intermediate its ends each arm carries a roller 112 coacting with a cam 114 on a cam shaft 116 which is driven by a chain 118 from the shaft 26. As illustrated, the cam is circular in outline and has several flat spots thereon for vertically vibrating the magazine consisting of the troughs 100 and this constitutes a shaker arrangement for properly feeding the cookies by gravity along the troughs and between their lower ends 102 and the guide and gauge plates 105 until they are deposited on carrier assemblies which will next be described. This cam action insures against cookies remaining in adherence with the troughs of the magazines.

Reference is now made particularly to Figs. 1A, 2, 3 and 7 for details of the carrier assemblies. One of these as illustrated in Fig. 1A comprises a book back B and a pair of leaves $L^1$ and $L^2$. The leaves are provided with ears 124 having slots 126 therein receiving pivot pins 128 extending from the front and rear ends of the book back B. The leaves are provided with rear lugs 130 to pick up the cookies from the magazines and side lugs 132 to support the sandwiches when the leaves are closed upwardly, as will hereinafter appear. The rear lugs 130 are initial pick-up means for removing cookies from the stack in the magazine and the slots 126 provide lost motion in the pivots to permit sandwiching cookies of different thicknesses and also permit different thickness of coating material to be deposited on the cookies. The side lugs 132 intermesh to support the sandwich in the process of bringing cookies together and after formation of the sandwich, the leaf $L^1$ supports it until this leaf is horizontal.

The components of the sandwich are thus carried through the machine in the carrier assembly just described. One cooky lies on each leaf of the carrier assembly and the creme deposit is applied to one cooky. The two leaves are then closed by cams through which they pass, thus forming a sandwich. The carrier is then cammed open and the finished sandwich is stripped from the carrier and deposited in the stacker, all as will now be described. The leaf $L^1$ is slotted at 138 to clear a stripper wire, as will later be described.

Figure 3:
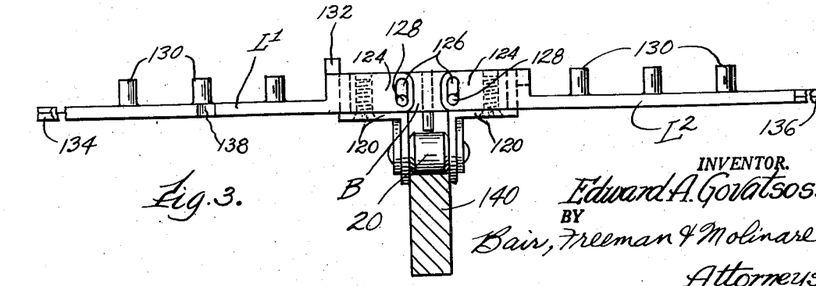
Fig. 3 is a further enlarged vertical sectional view of a portion of Fig. 2 showing particularly a front end elevation of a carrier "book" in the opened position ready to receive cookies.
Figures 6, 7, 8:
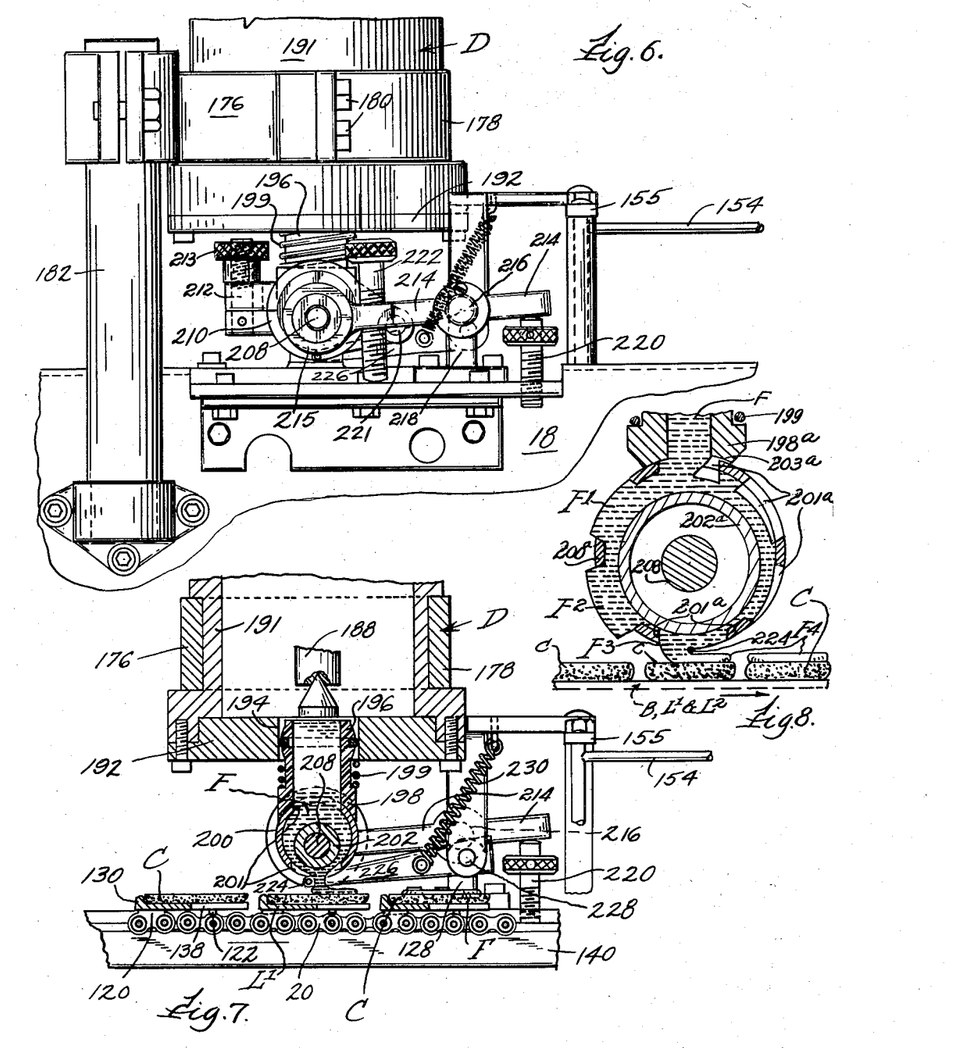
Fig. 6 is an enlarged side elevation of the depositor looking in the direction of the arrow 6 adjacent Fig. 4 to show an adjustable mount for the drum of the depositor.
Fig. 7 is a vertical sectional view on the line 7—7 of Fig. 5 showing details of the depositor.
Fig. 8 is a similar vertical sectional view, further enlarged, showing a modified form of depositor.

Each back B is secured to the chain 20 or 20a by means of a pair of angle brackets 120 as shown in Fig. 3, the horizontal flanges of which are attached to the bottom surface of the back B by screws or the like and the vertical flanges of which receive one of the roller pins of the chain. The outer edges of the leaves L¹ and L² are provided with camming lugs 134 and 136, respectively. At 122, I provide a pad in the form of a pin extending downwardly from the back B to engage one of the rollers of the chain 20 ahead of the angle brackets 120 as shown in Fig. 7. These pads support the carrier assemblies in horizontal position (against droop at their forward ends) as the chain travels along a guide bar 140.

Figure 10:
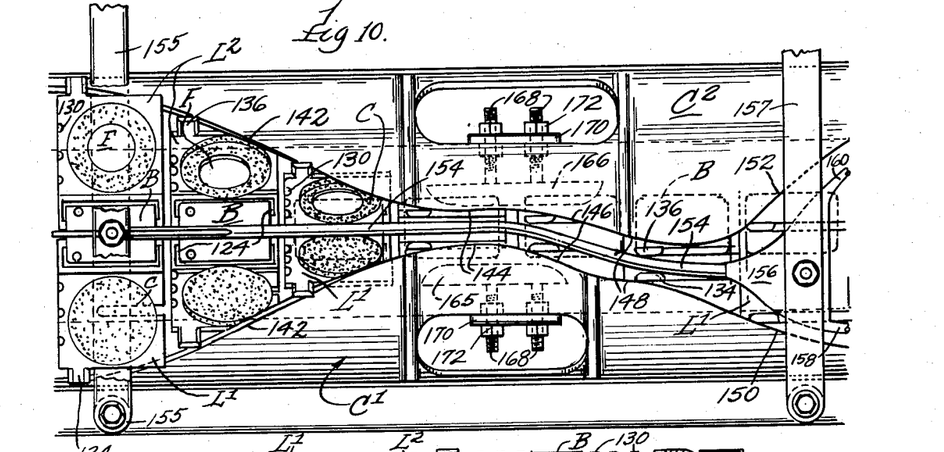
Fig. 10 is a plan view on an enlarged scale of that portion of Fig. 1 indicated by the bracket 10.

Two rows of the sandwiches travel through the machine from left to right in Fig. 1 and a depositor is shown generally at D, beyond which there are a pair of complemented barrel cams C¹ and C² for each row. These cams have a plurality of cam surfaces (see Figs. 10 and 10A) for coaction with the cam lugs 134 and 136 of the carrier assembly shown in Fig. 1A which cam surfaces may be identified as follows, the reference numerals being applied at approximately the center of each cam surface:

142—Closing cam surfaces
144—Holding cam surfaces
146—Inclining cam surfaces
148—Holding inclined cam surfaces
150—Opening cam surface of C¹
152—Opening cam surface of C²

Spaced substantially half-way between some of the cam surfaces just described is a guide rod 154 supported at one end on a cross-bar 155 and at its other end on a triangular shaped rod connector 156 supported on a cross-bar 157. A pair of guide rods 158 and 160 extend onwardly from the rod connector 156 to guide brackets 162 and 164.

As illustrated on the drawings, there are two of the cams C¹ and two of the cams C², each having three guide rods 154, 158 and 160, and the guide bracket 164 is a common one between the two cams whereas there are two of the brackets 162 at the right and left sides of the machine, only one-half of the machine being shown in the plan view, Fig. 10.

In the barrel cam C¹ is a gauging cam 165 and in the barrel cam C² is a gauging cam 166. Each of these cams is supported by a pair of supporting rods 168, which extend through a supporting bracket 170, the rods being threaded and provided with lock nuts 172 for adjusting the cams 165 and 166 for thin or thick sandwiches as required.

Returning to the depositor D (Figs. 4 to 7), I provide a hopper 174 for receiving creme or other related materials. The hopper is supported in a semi-circular seat of a crossbar 176 and is removably held therein by a clamp cap 178 and clamp screws 180. The crossbar 176 at its ends is supported on a pair of posts 182 and 184 connected rigidly with the upper frame 18.

For feeding the creme downwardly in the hopper 174, I provide within the neck at the lower end thereof (see Fig. 4) a helical screw 186 mounted on a vertical shaft 188. I also provide an agitator rod 190 for feeding the creme downwardly to the helical screw 186. The hopper 174 has a neck 191 in which is located the screw 186. A bottom plate 192 for the neck has therein a pair of vertical cylinder bores 194 in which O-ringed pistons 196 are slidably mounted. The pistons terminate in follower heads 198 at their lower ends which are biased downwardly by springs 199 against an outer drum 200 forming part of the depositor mechanism.

Figures 4, 5:
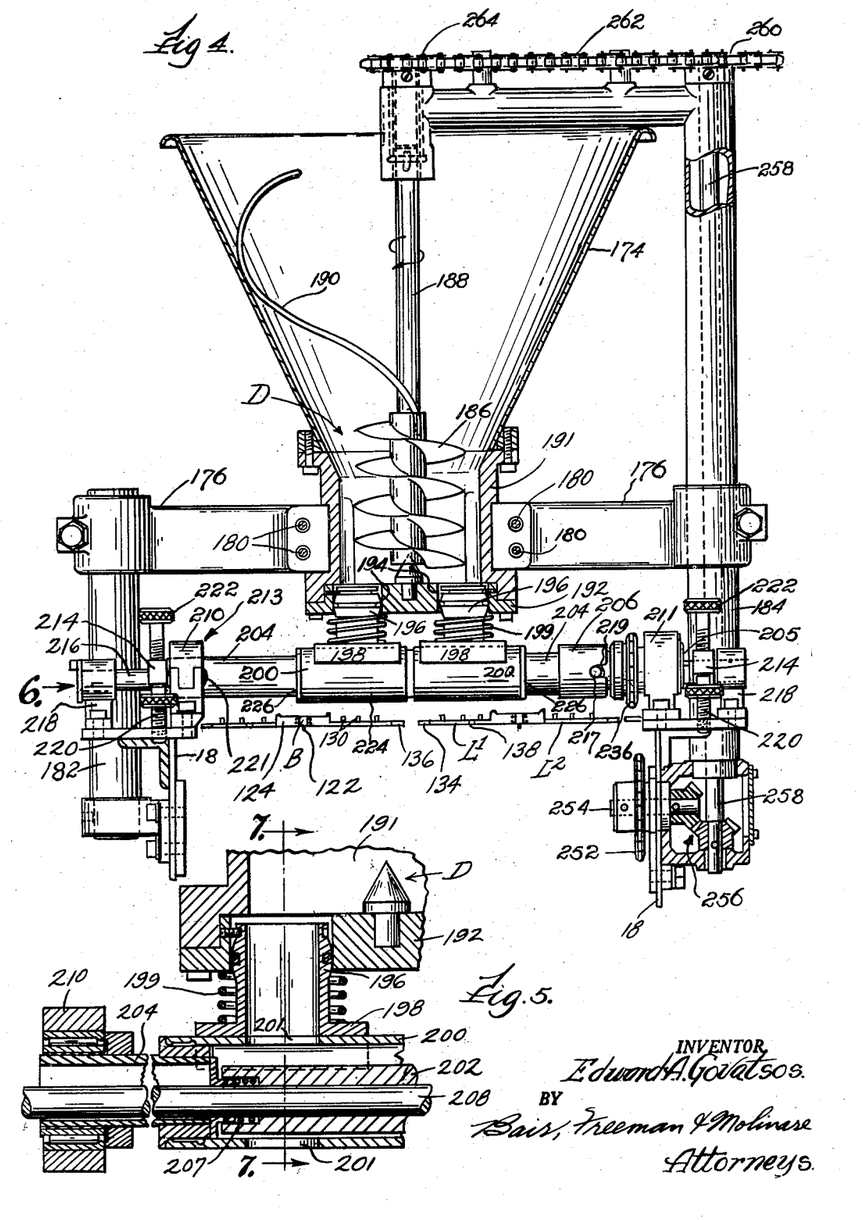
Fig. 4 is an enlarged vertical sectional view on the line 4—4 of Fig. 1 showing particularly a depositor and some of the details thereof.
Fig. 5 is a further enlarged vertical sectional view of a portion of the depositor.

The drum 200 has a pair of opposite receiving and discharge openings 201 therein, as shown in Figs. 5 and 7, and inside of this drum is an inner drum 202. The outer drum is supported by a tubular shaft 204 having a connecting sleeve 206 at one end. The inner drum 202 has a shaft 208 for its support and is eccentrically related to the outer drum 200, there being an O-ringed seal flange 209 at each end of the inner drum biased to sealing position by a spring 207.

The connecting sleeve 206 is removably connected to a shaft 205 journalled in a bearing 211 by a pin and notch coupling arrangement 217–219 and the other end of the shaft 204 is supported in an openable bearing 210 which is held closed by a clamp screw 212 and a knurled clamp nut 213, the two halves of the bearing 210 being hinged at 221. In this way the bearing 210 can be opened for removing the assembly of outer drum 200 and inner drum 202 for cleaning purposes or for replacement by a different drum such as the modified form shown in Fig. 8 if desired. In the modification shown in Fig. 8, those parts which are modifications with respect to Figs. 1 to 7 are given the same reference numerals with the addition of the distinguishing characteristic $a$. The follower head 198$a$ is somewhat modified in shape and the drum 200$a$ has six receiving and discharging openings 201$a$ instead of two as in Fig. 7. About .010 to .015 inch clearance is provided as indicated at 203$a$ so that any film of creme which is not scraped clear of the stencil by the wire passes through this small clearance between the feed shoe and the stencil and re-enters the main mass of creme en route to the stencil opening.

As previously stated, the drums 200 and 202 are eccentrically related and this is accomplished by supporting the shaft 208 for the inner drum in hubs 215 of adjusting arms 214. The arms 214 are pivotally supported at 216 on brackets 218 and the hubs 215 are held in the desired adjusted position by upward limiting screws 220 and downward limiting screws 222.

A cut-off wire 224 scrapes the lower surface of the outer drum 200 and is supported by a pair of arms 226 pivoted at 228. A spring 230 biases the wire to engage the drum in an obvious manner.

Figure 9:
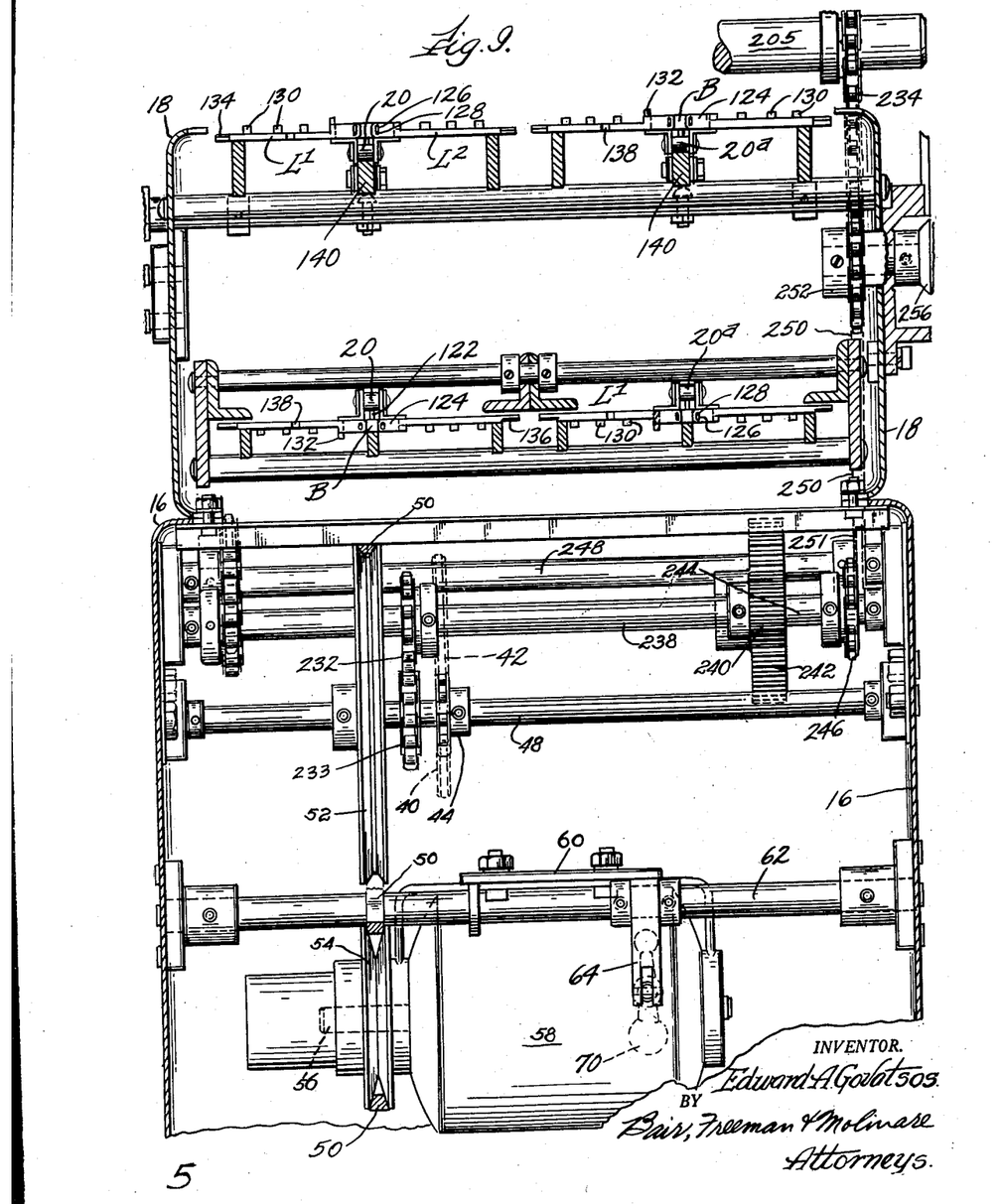
Fig. 9 is an enlarged vertical sectional view on the line 9—9 of Fig. 1 showing a drive arrangement for various instrumentalities of my sandwiching machine.

For driving the drums 200 and 202 a chain 232 (see Fig. 1) extends from the sprocket 84 (see Fig. 11) over an idler 233 on the shaft 48 (see Fig. 9) to a suitable counter shaft 238. Another chain 234 extends from the counter shaft 238 to a sprocket 236 on the shaft 205 (see Fig. 4). The outer drum 200 is thus driven by the sleeve 206 and shaft 204 while the inner drum 202 floats therein and is actually driven by the creme filler indicated as F in Figs. 7 and 8.

The counter shaft 238 through a pinion 240 and a gear 242 drives a second counter shaft 244. A third counter shaft 248 is driven by a chain 246 and from the shaft 248 a chain 250 extends upwardly to a sprocket 252 (Figs. 1 and 4) mounted on a stub shaft 254. Bevel gears 256 operatively connect the stub shaft 254 with a vertical shaft 258 terminating at its top in a sprocket 260 which is connected by a chain 262 to a sprocket 264 on the upper end of the vertical shaft 188. Thus, the latter shaft is driven for rotating the helical screw 186 and the agitator rod 190.

Figures 12, 14:
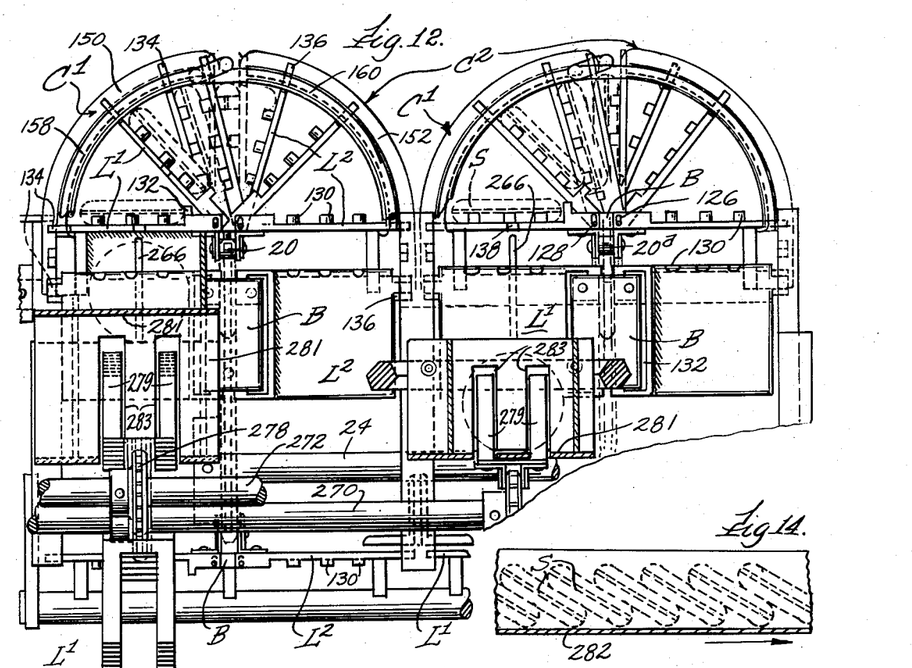
Fig. 12 is an end view of the discharge end of the machine.
Fig. 14 is a diagram to show how the sandwiches lie overlapped on the take-away conveyor for convenience in picking them up for packing.
Figure 13:
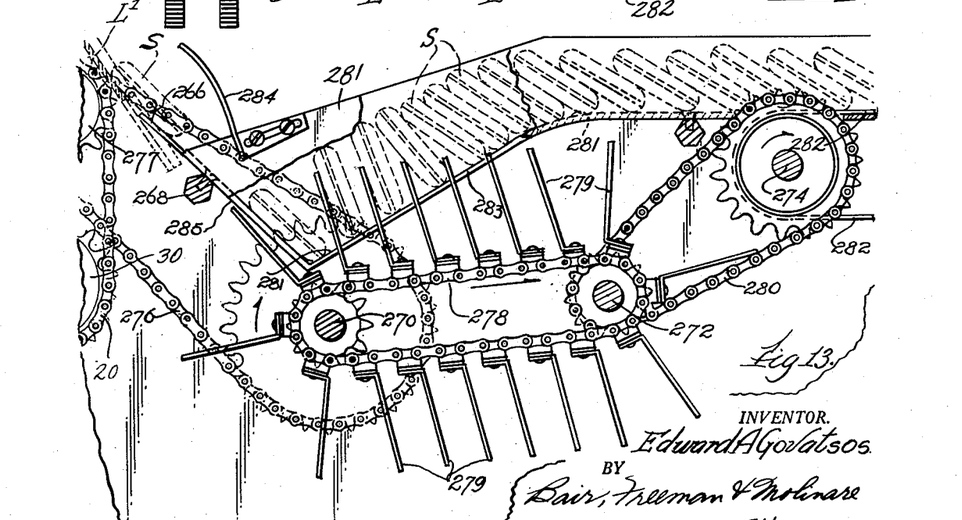
Fig. 13 is a vertical sectional view through the take-out end of the machine on an enlarged scale with respect to Fig. 1.

Referring to Figs. 12 and 13, a stripper wire 266 is provided supported on a crossbar 268. The stripper wire is adapted to strip the completed sandwiches indicated as S from the carrier assemblies as they reach the position of the one shown at L¹ in Fig. 13 and the slots 138 of the leaves L¹ are provided for clearing the stripper wire and enabling it to engage the sandwiches and strip them from the leaves unless they are thrown therefrom by centrifugal force when the machine is operated at a higher speed, as will be explained later. There are three shafts 270, 272 and 274 which are driven by chains 276, 278 and 280. The chain 278 constitutes a first take-away conveyor, and a belt 282 driven by the chain 280 constitutes a second take-away conveyor. The chain 276 as shown in Fig. 11, is driven from a sprocket 277 on the shaft 22.

The take-away conveyor chain 278 has attached thereto two rows of spaced apart flights 279. These operate through a trough 281, slots 283 being provided in the trough for this purpose. Also, the trough has an extension 285 to guide the sandwiches S which are stripped from the carrier assemblies by the stripper wire 266 into the spaces between the flights 279 as shown in Fig. 13. In case the speed of the machine is such that the sandwiches are thrown by centrifugal force from the carrier assembly they impinge the shoe 284 and are similarly guided into the spaces between the flights 279 at the discharge end of the machine. To direct sandwiches into the slots of stacker conveyor formed by the flights 279 the stripper wire 266 enters the slot 138 of each carrier assembly leaf $L^1$ as it goes over the end sprockets 22 to strip the sandwiches off the leaves. The stacker consists of the continuously moving chain 278 containing the flights 279 which are inclined, spaced and timed to receive the individual sandwiches as they fall down the inclined chute 285 after being stripped from the carrier assembly.

Practical operation

In the operation of my sandwiching machine, the depositor hopper 174 is filled with a suitable creme and the magazine troughs 100 are filled with cookies C and are kept filled by an operator (or automatically from a suitable hopper if desired). As a carrier assembly comes up over the sprocket 32, the rear lugs 130 of its leaves $L^1$ and $L^2$ remove a cooky from the hopper for each leaf and these are carried forwardly in a horizontal position until after they pass under the depositor D. The cams 114 effect vertical vibration of the magazines so that the cookies feed properly onto the leaves of the book and the gauge plates 105 (having been properly adjusted) insure that only a single cooky is picked up by each leaf of the book.

At the depositor D (see Fig. 7 or 8) where the drums 200 and 202 are rotating counter-clockwise, a receiving and discharge opening 201 thereof when at the top of the drum will have the creme filler F forced into it by the helical screw 186 of Fig. 4. The filler is squeezed through the opening 201a as illustrated in detail in Fig. 8, being extruded at the back of the drum such as indicated at $F^1$ and $F^2$ and further extruded as at $F^3$. The extrusion $F^3$ is cut off by the cutting wire 224 and forms a deposit on each cooky C on each leaf $L^1$ of the carrier assemblies as indicated at $F^4$. This arrangement provides a means of depositing sandwich creme or related materials on cookies and the like of any desired shape at high speed because there is no intermittent or reciprocating motion such as provided with those type of depositors using pistons, but all mechanism of the depositor rotates at a constant speed. The outer drum 200 serves as a stencil with the creme being supplied thereto under pressure by reason of the constantly rotating helical screw 186.

When the creme enters the opening 201a it is carried into the area between the stencil and the inner drum 202 by pressure to which it is subjected by the screw and frictional forces between it and the rotating outer drum or stencil. The inner drum 202 may be free to rotate and an external drive means therefore is found unnecessary.

Due to the eccentricity between the outer and inner drums the creme is forced into a diminishing area causing the extrusions indicated at $F^1$, $F^2$ and $F^3$ through the stencil openings. The extruded creme is scraped from the stencil by the cutting wire 224 causing it to be deposited upon the cooky beneath. Any film of creme which is not scraped clear of the stencil by the wire passes through the clearance opening 303a, and reenters the main mass of creme en route to the stencil openings. The arrangement can be either as shown in Fig. 7 or in Fig. 8, Fig. 8 being more adaptable for a higher speed operation as there are six extrusions per revolution of the drum instead of two as in Fig. 7. In other respects the operation is substantially the same.

As the carrier assemblies move into the barrel cams $C^1$ and $C^2$ the closing cam surfaces 142 bring the leaves $L^1$ and $L^2$ to a vertical position. The side lugs 132 of the assemblies or books interfit with each other to form a supporting surface for the lower edge of the sandwich and the rear lugs 130 are staggered so that they do not interfere with each other when the books are closed. The lugs 132 are similarly staggered for the same purpose.

The guide rod 154 prevents the leaves $L^1$ and $L^2$ dropping too far toward each other, and the distance between the leaves and therefore the thickness of the sandwich may be regulated by the gauging cams 165 and 166 in an obvious manner.

The leaves $L^1$ and $L^2$ are momentarily held in vertical position by the holding cam surfaces 144 and then both of them are inclined to one side by the inclining cam surfaces 146. They are then momentarily held in the inclined position by the holding inclined cam surfaces 148 and as they reach the rod connector 156 they are opened by its engagement with the lugs 134 and 136 and by the rods 158 and 160, respectively, the opening cam surfaces 150 and 152 serving to limit the opening of the leaves which finally assume the horizontal position by the time they reach the guide brackets 162 and 164.

Thereafter the chain 20 passes around the sprocket 28 and the sandwiches are stripped from the leaf $L^1$ by the stripper wire 266 and they enter the spaces between the flights 279 of the take-away conveyor chain 278, as illustrated in Fig. 13. The sandwiches are then pushed up along the trough 281 in the inclined position shown, the flights 279 being likewise inclined for this purpose, and the flights are gradually withdrawn from contact with the sandwiches due to the inclination of the trough 281. The sandwiches are forced along the trough as in Fig. 13 and are finally picked up by the belt 282 which is traveling at such increased speed as to somewhat spread the sandwiches out as in Fig. 14 in partially lapped relation, with one having a portion beneath the preceding sandwich by virtue of which a series of the sandwiches may be readily picked up off the take-away conveyor belt 282 without disturbing the feed line coming off the machine. This allows the packing operator easier access to the cookies for packing, as each sandwich lies on its successor rather than under it, thereby allowing removal of a handful at a time for packaging purposes.

From the foregoing specification it will be obvious that I have provided a sandwiching machine which can be operated at relatively high speed due to the carrier book arrangement, and the mechanism for closing and opening the books operates in a smoothly cammed fashion with the filler deposit being continuously extruded from a rotary instead of a reciprocating mechanism. After the books are opened the sandwiches can be stripped therefrom at relatively high speed and are ejected from the machine in an overlapping arrangement that permits relatively high speed pickup and packing of the completed sandwiches in readily handled groups.

The drive for the various instrumentalities of my sandwiching machine have been described and, for the most part, include chain and sprocket arrangements. The adjustable differential arrangements shown in Fig. 11, however, has special significance in that it permits adjustment of the sandwich carrier conveyor for timed relation to the depositor discharge for centering the deposit of creme filler F on the cooky C on the leaf $L^1$ of the carrier book so as to correct for a too-early or a too-late deposit of the filler which would cause the deposit to be off-center relative to the cooky. By means of the adjusting crank 98, the stud 80 may be swung forwardly or rearwardly to change the position of the bevel gear 76 relative to the bevel gear 72, thus likewise changing the relationship between the shafts 46 and 78 and since the depositor is driven from the shaft 78 through the sprocket 84 and the shaft 22 of the carrier conveyor is driven from the shaft 46 the conveyor is adjusted relative to the depositor to get an exact centering of the creme deposit on the cooky.

Some changes may be made in the construction and arrangement of the parts of my sandwiching machine without departing from the real spirit and purpose of my invention. It is my intention therefore to cover by my claims such modified forms of structure or use of mechanical equivalents as may reasonably be included within their scope.

I claim as my invention:

1. A depositor for a sandwiching machine of the character disclosed comprising a hopper, a rotatable drum therebelow having a plurality of receiving and discharging openings therein, a bottom member for said hopper having a bore therein, a piston slidable in said bore and terminating in a follower head biased against said drum, said piston and head being hollow for feeding fill material from said hopper to said drum, spiral screw means rotatable in said hopper for pressurizing the material therein and feeding it through said piston and head and then through said receiving and discharging openings into said drum, a cylinder eccentrically mounted in said drum to effect squeezing of said fill material from the drum through said receiving and discharging openings onto a cookie or the like, and a cut-off wire engaging the surface of said drum next to such cookie to cut off fill material extruded from said receiving and discharging openings by said cylinder.

2. A depositor for a sandwiching machine comprising a hopper, a rotatable drum therebelow having a receiving and discharging opening therein, a bottom member for said hopper having a bore therein, a piston slidable in said bore and terminating in a follower head biased against said drum, said piston and head being hollow for feeding fill material to said drum, means for pressurizing the fill material in said hopper and feeding it through said piston and head and then through said receiving and discharging opening into said drum, a cylinder eccentrically mounted in said drum to effect squeezing of said fill material from the drum through said receiving and discharging opening onto a cookie or the like, and a cut-off wire engaging the surface of said drum to cut off extruded fill material.

3. A depositor for a machine of the character disclosed comprising a hopper, a rotatable drum therebelow having a receiving and discharging opening therein, a bottom member for said hopper having a bore therein, a piston slidable in said bore and terminating in a follower head biased against said drum, said piston and head being hollow for feeding fill material to said drum, a cylinder, a shaft therefor eccentrically mounted in said drum to effect squeezing of said fill material from the drum through said receiving and discharging opening onto a cookie or the like, a wire to cut off fill material extruded from said receiving and discharging openings by said cylinder, floating sealing discs in said drum on said shaft and interposed between the drum and cylinder to confine the fill material in the drum, and spring means biasing said sealing discs into engagement with said drum.

4. In a depositor for a machine of the character described, a hopper, a rotatable drum therebelow having a receiving and discharging opening therein, a cylinder eccentrically mounted in said drum to effect squeezing of fill material from the drum through said receiving and discharging openings onto a cookie or the like, a wire to cut off fill material extruded from said receiving and discharging opening, floating sealing discs interposed between said drum and said cylinder to confine the fill material in the drum, and means biasing said sealing discs into engagement with said drum.

5. In a depositor for a machine of the character described having a sandwiching conveyor, said depositor comprising a hopper, a rotatable drum therebelow having a plurality of receiving and discharging openings therein, a bottom member for said hopper having a bore therein, a piston slidable in said bore and terminating in a follower head biased against said drum, said piston and head being hollow for feeding fill material to said drum, means rotatable in said hopper for pressurizing the material therein and feeding it through said piston and head and then through said receiving and discharging openings into said drum, a cylinder eccentrically mounted in said drum to effect squeezing of said fill material from the drum through said receiving and discharging openings onto a cookie or the like, a cut-off wire engaging the surface of said drum next to the cookie to cut off fill material extruded from said receiving and discharging openings by said cylinder, floating sealing discs in said drum on the shaft of said cylinder and interposed between the drum and cylinder to confine the fill material in the drum, spring means biasing said sealing discs into engagement with said drum, and means for relatively adjusting said sandwiching conveyor and said depositor to effect centering of the fill material on the cookie.

6. In a depositor for a sandwiching machine having a sandwiching conveyor, said depositor comprising a hopper, a rotatable drum therebelow having a plurality of receiving and discharging openings therein, a bottom member for said hopper having a bore therein, a piston slidable in said bore and terminating in a follower head biased against said drum, said piston and head being hollow for feeding fill material to said drum, a cylinder eccentrically mounted in said drum to effect squeezing of said fill material from the drum through said receiving and discharging openings onto a cookie or the like on said sandwiching conveyor, a wire engaging the surface of said drum next to the sandwiching conveyor to cut off fill material extruded from said receiving and discharging openings by said cylinder, and differential drive means for relatively adjusting said sandwiching conveyor and said depositor to effect centering of the fill material on the cookie.

7. A depositor for a sandwich machine comprising a hopper, a rotatable drum therebelow having a plurality of receiving and discharging openings therein, a cylinder eccentrically mounted in said drum to effect squeezing of fill material from the drum through said receiving and discharging openings onto a cookie or the like, a cut-off wire engaging the surface of said drum to cut off fill material extruded from said receiving and discharging openings by said cylinder, floating sealing discs interposed between the drum and cylinder to confine the fill material in the drum, and means biasing said sealing discs into sealing engagement.

8. In a depositor for a sandwiching machine having a conveyor, said depositor comprising a hopper, a rotatable drum therebelow having a plurality of receiving and discharging openings therein, a bottom member for said hopper having a bore therein, a piston slidable in said bore and terminating in a follower head biased against said drum, said piston and head being hollow for feeding filler material to said drum, means in said hopper for pressurizing the material therein and feeding it through said piston and head and then through said receiving and discharging openings into said drum, a cylinder eccentrically mounted in said drum to effect squeezing of said fill material from the drum through said receiving and discharging openings onto a cookie on said conveyor, a cut-off wire engaging the surface of said drum next to the conveyor to cut off fill material extruded from said receiving and discharging openings by said cylinder, and differential means for relatively adjusting said conveyor and said drum to effect centering of the fill material on the cookie.

9. A depositor for a sandwiching machine comprising a hopper, a rotatable drum therebelow having a receiving and discharging opening therein, a bottom member for said hopper having a bore therein, a piston slidable in said bore and terminating in a follower head biased against said drum, a cylinder eccentrically mounted in said drum to effect squeezing of fill material from the drum through said receiving and discharging openings onto a cookie or the like, a cut-off wire engaging the surface of said drum to cut off fill material extruded from said receiving and discharging opening by said cylinder, floating sealing discs in said drum on the shaft of said cylinder and interposed between the drum and cylinder to confine the fill material in the drum, and spring means biasing said sealing discs into engagement with said drum.

10. In a depositor for a machine of the character disclosed having a sandwiching conveyor, comprising a hopper, a rotatable drum therebelow having a plurality of receiving and discharging openings therein, a bottom member for said hopper having a bore therein, a piston slidable in said bore and terminating in a follower head biased against said drum, said piston and head being hollow for feeding fill material to said drum, a cylinder eccentrically mounted in said drum to effect squeezing of said fill material from the drum through said receiving and discharging openings onto a cookie on said sandwiching conveyor, a cut-off wire engaging the surface of said drum next to the carrier assemblies to cut off fill material extruded from said receiving and discharging openings by said cylinder, and means for relatively adjusting said sandwiching conveyor and said depositor to effect centering of the fill material on the cookie.

11. In a depositor for a sandwiching machine having a sandwiching conveyor, said depositor comprising a hopper, a rotatable drum therebelow having a plurality of receiving and discharging openings therein, a bottom member for said hopper having a bore therein, a piston slidable in said bore and terminating in a follower head biased against said drum, said piston and head being hollow for feeding fill material to said drum, spiral screw means rotatable in said hopper for pressurizing the material therein and feeding it through said piston and head and then through said receiving and discharging openings into said drum, a cylinder eccentrically mounted in said drum to effect squeezing of said fill material from the drum through said receiving and discharging openings onto a cookie on said sandwiching conveyor, a wire to cut off fill material extruded from said receiving and discharging openings by said cylinder, and differential drive means for relatively adjusting said sandwiching conveyor and said depositor to effect centering of the fill material on the cookie.

12. A depositor for a sandwiching machine of the character described having a conveyor chain, said depositor comprising a hopper, a rotatable drum therebelow having a receiving and discharging opening therein, a cylinder eccentrically mounted in said drum to effect squeezing of fill material from the drum through said receiving and discharging openings onto a cookie on said conveyor chain, a cut-off wire engaging the surface of said drum next to the chain to cut off fill material extruded from said receiving and discharging opening by said cylinder, and means for relatively adjusting said conveyor chain and said drum to effect centering of the fill material on the cookie.

13. A depositor for a sandwiching machine of the character described having a sandwiching conveyor, said depositor comprising a hopper, a rotatable drum therebelow having a receiving and discharging opening therein, a cylinder eccentrically mounted in said drum to effect squeezing of fill material from the drum through said receiving and discharging openings onto a cookie on said sandwiching conveyor, a wire to cut off fill material extruded from said receiving and discharging openings by said cylinder, floating sealing discs interposed between the drum and cylinder to confine the fill material in the drum, spring means biasing said sealing discs into sealing engagement, and means for relatively adjusting said sandwiching conveyor and said depositor to effect centering of the fill material on the cookie.

References Cited in the file of this patent

UNITED STATES PATENTS

| | | |
|---|---|---|
| 208,272 | Spencer | Sept. 24, 1878 |
| 215,006 | Lampert et al. | May 6, 1879 |
| 546,662 | Gage | Sept. 24, 1885 |
| 1,057,231 | Frischmann | Mar. 25, 1913 |
| 1,667,692 | Salerno | Apr. 24, 1928 |
| 1,973,195 | Ankcorn | Sept. 11, 1934 |
| 2,055,605 | Jensen | Sept. 29, 1936 |
| 2,391,937 | Arvidson | Jan. 1, 1946 |
| 2,394,795 | Manspeaker | Feb. 12, 1946 |
| 2,551,992 | Aasted | May 8, 1951 |